US010284560B2

(12) United States Patent
Manley (10) Patent No.: US 10,284,560 B2
(45) Date of Patent: May 7, 2019

(54) SECURE UNMANNED VEHICLE OPERATION AND COMMUNICATION

(71) Applicant: Just Innovation, Inc., Kingston, MA (US)

(72) Inventor: Justin Evan Manley, Kingston, MA (US)

(73) Assignee: Just Innovation, Inc., Kingston, MA (US)

( * ) Notice: Subject to any disclaimer, the term of this patent is extended or adjusted under 35 U.S.C. 154(b) by 8 days.

(21) Appl. No.: 15/170,817

(22) Filed: Jun. 1, 2016

(65) Prior Publication Data

US 2017/0054725 A1   Feb. 23, 2017

Related U.S. Application Data

(60) Provisional application No. 62/208,668, filed on Aug. 22, 2015.

(51) Int. Cl.
*H04L 9/00* (2006.01)
*H04L 29/06* (2006.01)
(Continued)

(52) U.S. Cl.
CPC .......... *H04L 63/10* (2013.01); *H04L 63/0861* (2013.01); *H04W 12/06* (2013.01);
(Continued)

(58) Field of Classification Search
CPC ....................................................... H04L 63/10
See application file for complete search history.

(56) References Cited

U.S. PATENT DOCUMENTS 6,801,941 B1 * 10/2004 Stephens ........... H04L 29/12311
709/225
7,415,331 B2    8/2008 Dapp et al.
(Continued)

FOREIGN PATENT DOCUMENTS

WO    WO2017034839 A1    3/2017
WO    WO2017034840 A1    3/2017

OTHER PUBLICATIONS

Kim et al. "Cyber Attack Vulnerabilities Analysis for Unmanned Aerial Vehicles" American Institute of Aeronautics and Astronautics, Jun. 2012, pp. 1-30.
(Continued)

*Primary Examiner* — Alexander Lagor
*Assistant Examiner* — Syed M Ahsan
(74) *Attorney, Agent, or Firm* — Carr & Ferrell LLP (57) ABSTRACT

Systems and methods for unmanned vehicle security and control are provided herein. An exemplary system includes a control station and an unmanned vehicle. The unmanned vehicle may be locked from remote control by the control station. The system may also include a first access control hardware device attached to the control station and communicably coupled, using a network, with the unmanned vehicle. The system may also include a second access control hardware device physically attached to the unmanned vehicle and communicably coupled, using the network, with the control station. The first and/or second access control hardware devices are utilized to unlock the unmanned vehicle from remote control by the control station.

19 Claims, 4 Drawing Sheets

(51) Int. Cl.
*H04W 12/06* (2009.01)
*B64C 39/02* (2006.01)
*H04W 12/08* (2009.01)

(52) U.S. Cl.
CPC ........ *B64C 39/024* (2013.01); *H04L 63/0435* (2013.01); *H04L 63/0853* (2013.01); *H04W 12/08* (2013.01)

(56) References Cited

U.S. PATENT DOCUMENTS

| | | |
|---|---|---|
| 8,219,799 B1 | 7/2012 | Lucchesi et al. |
| 8,355,834 B2 | 1/2013 | Duggan et al. |
| 8,751,147 B2 | 6/2014 | Colwell |
| 8,857,754 B2 | 10/2014 | Ferrari et al. |
| 8,958,928 B2 | 2/2015 | Seydoux et al. |
| 9,022,324 B1 | 5/2015 | Abhyanker et al. |
| 9,031,732 B1 | 5/2015 | Cudak et al. |
| 9,031,733 B1 | 5/2015 | Lids et al. |
| 9,037,337 B1 | 5/2015 | Cudak et al. |
| 9,075,415 B2 | 7/2015 | Kugelmass |
| 9,087,451 B1 | 7/2015 | Jarrell |
| 9,100,361 B1 | 8/2015 | Lucchesi et al. |
| 10,102,757 B2 | 10/2018 | Manley |
| 2005/0114023 A1 | 5/2005 | Williamson et al. |
| 2008/0114544 A1 | 5/2008 | Liu et al. |
| 2010/0001902 A1 | 1/2010 | Smith |
| 2010/0302359 A1 | 12/2010 | Adams et al. |
| 2013/0173088 A1 | 7/2013 | Callou et al. |
| 2014/0010371 A1* | 1/2014 | Khazan ............... G06F 21/602 380/278 |
| 2014/0152422 A1* | 6/2014 | Breed ............... G06K 9/00369 340/5.52 |
| 2014/0157041 A1 | 6/2014 | Danielsson et al. |
| 2014/0244078 A1 | 8/2014 | Downey et al. |
| 2014/0244097 A1 | 8/2014 | Colwell |
| 2014/0254896 A1 | 9/2014 | Zhou et al. |
| 2014/0277854 A1 | 9/2014 | Jones et al. |
| 2015/0081156 A1 | 3/2015 | Trepagnier et al. |
| 2015/0094883 A1 | 4/2015 | Peeters et al. |
| 2015/0168144 A1 | 6/2015 | Barton et al. |
| 2015/0170524 A1 | 6/2015 | Stefani et al. |
| 2015/0175263 A1 | 6/2015 | Reyes |
| 2015/0205298 A1 | 7/2015 | Stoschek et al. |
| 2015/0211870 A1 | 7/2015 | Nickolaou |
| 2015/0223080 A1 | 8/2015 | Pulleti et al. |
| 2015/0242972 A1 | 8/2015 | Lemmey et al. |
| 2016/0327959 A1* | 11/2016 | Brown ............... G08G 5/0069 |
| 2017/0053537 A1 | 2/2017 | Manley |

OTHER PUBLICATIONS

Luong et al. "Securing Embedded Systems for Unmanned Aerial Vehicles" Worcester Polytechnic Institute [online], April 24, 2013, Retrieved from the Internet: <https://www.wpi.edu/Pubs/E-project/Available/E-project-042413-153504/ >,182 pages.

Javaid et al. "Single and Multiple UAV Cyber-Attack Simulation" EAI Endorsed Transaction on Scalable Information Systems, Jan. 2, 2015. vol. 2, Issue 4, pp. 1-11.

Hartmann et al. "The Vulnerability of UAVs to Cyber Attacks—An Approach to the Risk Assessment" In 2013 5th International Conference on Cyber Conflict, 23 pages.

Patent Cooperation Treaty Application No. PCT/US2016/046935, "International Search Report" and "Written Opinion of the International Searching Authority," Oct. 28, 2016, 9 pages.

Patent Cooperation Treaty Application No. PCT/US2016/046934, "International Search Report" and "Written Opinion of the International Searching Authority," Oct. 28, 2016, 8 pages.

* cited by examiner

SECURE UNMANNED VEHICLE OPERATION AND COMMUNICATION

CROSS REFERENCE TO RELATED APPLICATIONS

This application claims the benefit of U.S. Provisional Application Ser. No. 62/208,668, filed on Aug. 22, 2015, entitled "Device for securing the communications and/or operation of an unmanned vehicle," which is hereby incorporated in its entirety including all references and appendices cited therein.

FIELD OF THE INVENTION

The present technology of this application is directed generally to unmanned vehicle security and management, and more specifically, but not by way of limitation, to systems and methods for securing unmanned vehicle operation and communication.

BACKGROUND

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

As unmanned vehicles become more prevalent, maintaining security of these devices is a concern. As these vehicles are generally remotely controlled, traditional approaches to wireless security for unmanned vehicle operations attempt to secure the communications using software alone. As such, unmanned vehicles are vulnerable to a software attack, such as by a hacker. Embodiments of the present disclosure provide for secure wireless communication between an unmanned vehicle and its operator.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

In one embodiment, the present technology is directed to a system for unmanned vehicle security. The system comprising: a control station; an unmanned vehicle, the unmanned vehicle being locked from remote control by the control station; a first access control hardware device physically attached to the control station and communicably coupled, using a network, with the unmanned vehicle, the first access control hardware device outputting, using a processor and memory, encrypted vehicle control data in response to a first authentication input by an operator; and a second access control hardware device physically attached to the unmanned vehicle and communicably coupled, using the network, with the control station, the second access control hardware device generating, using a processor and memory, cryptographic information in response to a second authentication input by the operator, the cryptographic information being used to decrypt the encrypted vehicle control data, the decrypted vehicle control data being used to unlock the unmanned vehicle for control by the control station.

In an embodiment, the present technology is directed to a method for unmanned vehicle security. The method comprising: outputting, by a first access control hardware device physically attached to a control station and communicably coupled, by a network, with an unmanned vehicle, encrypted vehicle control data in response to a first authentication input by an operator; outputting, by the first access control hardware device, operator identifying information in response to the first authentication input by the operator; receiving, by a second access control hardware device physically attached to the unmanned vehicle and communicably coupled, by the network, with the control station, the encrypted vehicle control data; generating, by the second access control hardware device, cryptographic information in response to a second authentication input by the operator; decrypting the encrypted vehicle control data using the cryptographic information; unlocking the unmanned vehicle for control by the control station using the decrypted vehicle control data; receiving, by the second access control hardware device, the operator identifying information; validating the identifying information using the cryptographic information; and converting the operator to an approved operator for use of the control station after the validating operation of the identifying information.

According to one embodiment, the present technology is directed to a system for unmanned vehicle security. The system comprising: a control station; an unmanned vehicle, the unmanned vehicle being locked from remote control by the control station; a first access control hardware device physically attached to the control station and communicably coupled, using a network, with the unmanned vehicle, the first access control hardware device outputting encrypted vehicle control data and a decryption key in response to a first biometric authentication input by an operator; and a second access control hardware device physically attached to the unmanned vehicle and communicably coupled, using the network, with the control station, the second access control hardware device generating cryptographic information in response to a second biometric authentication input by the operator, the cryptographic information being used with the decryption key to decrypt the encrypted vehicle control data, the decrypted vehicle control data being used to unlock the unmanned vehicle for control by the control station.

Other features, examples, and embodiments are described below.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

In the following description, for purposes of explanation, numerous specific details are set forth in order to provide a thorough understanding of the disclosure. It will be apparent, however, to one skilled in the art, that the disclosure may be practiced without these specific details. In other instances, structures and devices are shown as block diagram form only in order to avoid obscuring the disclosure.

Reference throughout this specification to one "embodiment" or "an embodiment" means that a particular feature, structure, or characteristic described in connection with the embodiment is included in at least one embodiment of the present invention. Thus, the appearances of the phrases in one "embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Approaches to wireless security for unmanned vehicle operations may attempt to secure communications using software alone. Embodiments of the present technology provide a user with the option to generate secure code through a dedicated hardware device on both an unmanned vehicle (i.e., controlled device) and its control station providing the operator with certainty that communications between the controlled device and control station will not be compromised by software attacks.

Embodiments of the present technology provide a way for the operator of the unmanned vehicle to generate a unique code for secure wireless communications. Additional embodiments include adding secure wireless communications to existing unmanned vehicles and their control systems. Various embodiments include inserting secure wireless communications to the pre-manufacture design of unmanned vehicles and their control systems.

Embodiments of the present technology provide hardware based code generation to secure wireless communications.

Figure 1:
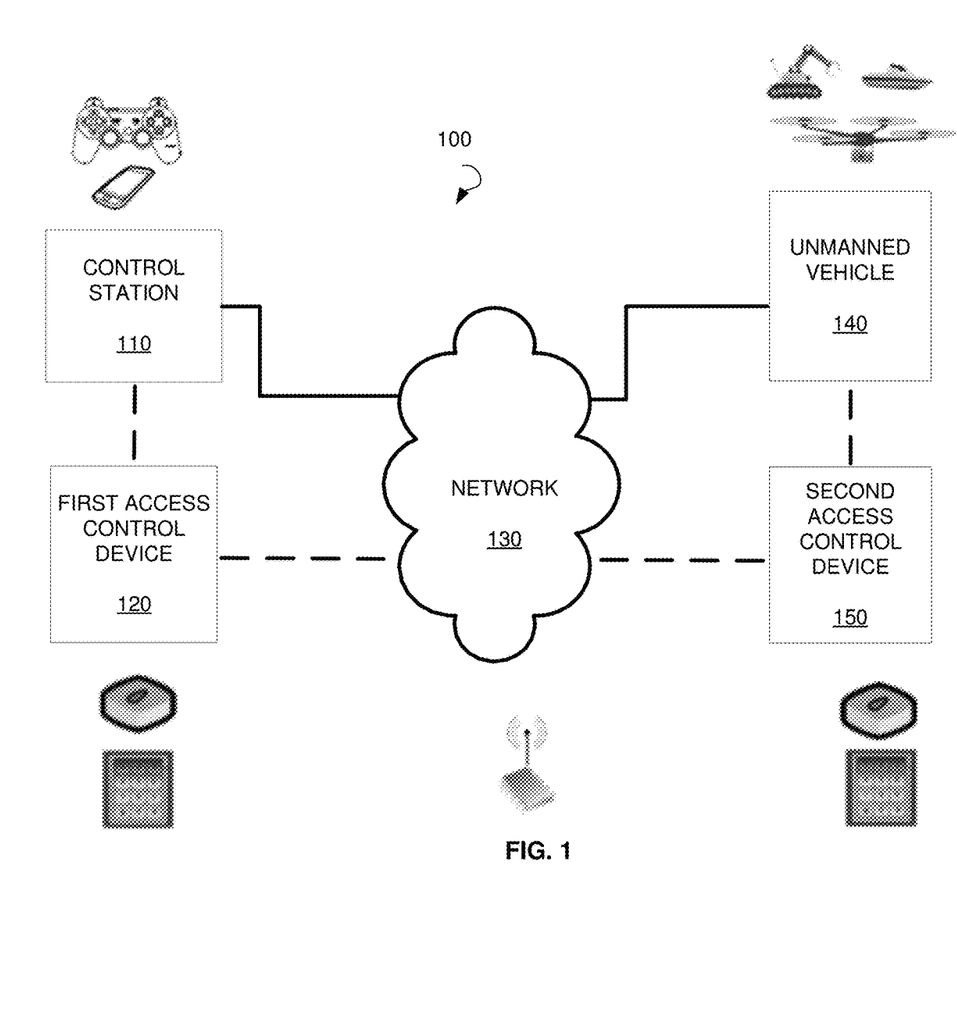
FIG. 1 is a simplified block diagram of a system for unmanned vehicle security, according to some embodiments of the present technology.

FIG. 1 illustrates a system for unmanned vehicle security (system) 100, according to some embodiments. The system 100 includes a control station 110, a first access control device 120, a network 130, an unmanned vehicle 140, and a second access control device 150.

In some embodiments, the control station 110, the first access control device 120, the unmanned vehicle 140, and the second access control device 150 include a computing device. A computing device is described further in relation to computer system 400 in FIG. 4.

The control station 110, the first access control device 120, the unmanned vehicle 140, and the second access control device 150 may communicatively couple via a public or private network, such as the network 130. Suitable networks (e.g., network 130) may include or interface with any one or more of wireless networks known to those of ordinary skill in the art. Exemplary wireless networks may include communications over radio frequencies, such as for example, digital spread spectrum radio control. Other exemplary wireless networks may include, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34bis analog modem connection, a cable modem, an ATM (Asynchronous Transfer Mode) connection, or an FDDI (Fiber Distributed Data Interface) or CDDI (Copper Distributed Data Interface) connection.

Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (cellular digital packet data), RIM (Research in Motion, Limited) duplex paging network, Bluetooth radio, or an IEEE 802.11-based radio frequency network. The network 130 can further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

In various embodiments, the control station 110 includes at least one of a personal computer (PC), hand held computing system, telephone, mobile computing system, workstation, tablet, phablet, wearable, mobile phone, server, minicomputer, mainframe computer, or any other computing system (e.g., computer system 400). The control station 110 may be any system configured to control the unmanned vehicle 140. The control station 110 communicably couples to the first access control device 120 using at least one of wired and wireless communications interfaces. By way of example and not limitation, wireless communications may be one or more of Digital Enhanced Cordless Telecommunications Ultra Low Energy (DECT ULE) (e.g., according to the European Telecommunications Standards Institute (ETSI)), WiFi 221 (e.g., IEEE 802.11), cellular/mobile network (e.g., GSM, CDMA, etc.), Bluetooth and/or BLE (e.g., according to the Bluetooth Special Interest Group), ZigBee (e.g., IEEE 802.15), ZWave (e.g., according to the Z-Wave Alliance), and the like.

The first access control device 120 includes a hardware device configured for accepting authentication input from an operator, human or electronic. In some embodiments, the first access control device 120 is physically attached to the control station 110 and communicably coupled, using the network 130, with the unmanned vehicle 140 and/or the second access control device 150 through the control station 110. In other embodiments, the first access control device 120 is in communication with the control station 110 in a wired or wireless manner. In further embodiments, the first access control device 120 is communicably coupled directly with the unmanned vehicle 140 and/or the second access control device 150 through network 130.

The first access control device 120 is configured to receive authentication input by an operator. In various embodiments, the authentication input can be biometric authentication, and/or a token-based identification system, and/or a knowledge-based identification system. For example, the first access control device 120 may be a hardware device that accepts biometric authentication using biometric identifiers of the operator including one or more of a fingerprint, face recognition, voice authentication, a palm print, hand geometry, iris recognition, retina recognition, a deoxyribonucleic acid (DNA) sample, and the like.

In other embodiments, the first access control device 120 may be a hardware device that accepts token-based identification using a personal identification document of the operator including one or more of an unmanned vehicle license, a government issued identification, a smart card, and the like. The first access control device 120 may be equipped with scanners and/or cameras to read documents and identifying cards. The first access control device 120 may be equipped with a chip reader or magnetic strip reader, such as those found on credit cards or hotel room keys, to accept an authentication input via these methods as well.

In other example embodiments, the first access control device 120 may be a hardware device that accepts knowledge-based identification using at least one of a password and a personal identification number or code.

In some embodiments, after accepting the authentication input from the operator, the first access control device 120 generates a secure code and inserts the secure code into the wireless communications between the unmanned vehicle 140 and the control station 110.

In various embodiments, the first access control device 120 outputs a secure code in response to the authentication input (e.g., biometric authentication, token-based identification system, or knowledge-based identification system) and sends the secure code to the control station 110. One or more microprocessors at the control station 110 receive the secure code and encode or encrypt the code to secure it. This secure code is sent by a wireless communication transmission and receiving system at the control station 110 across the network 130. The wireless communication transmission and receiving system may comprise a specialized circuit and antenna, and/or a network interface to communication via network 130 as described herein. In some embodiments, the secure code may be sent by a wireless communication transmission and receiving system on the first access control device 120 across the network 130 instead of by the control station 110.

In various embodiments, the secure code is received by a wireless communication transmission and receiving system on the unmanned vehicle 140 directly, and/or on the second access control device 150. The wireless communication system may comprise a specialized circuit and antenna, and/or a network interface to communication via network 130 as described herein.

In some embodiments, the second access control device 150 is physically attached to the unmanned vehicle 140 and communicably coupled, using the network 130, with the control station 110 and/or the first access control device 120 through the unmanned vehicle 140. In other embodiments, the second access control device 150 is in communication with the unmanned vehicle 140 in a wired or wireless manner. In further embodiments, the second access control device 150 is communicably coupled directly with the control station 110 and/or the first access control device 120 through network 130.

The second access control device 150 is a hardware device and generates cryptographic information in response to the authentication input by the operator and secure code received via network 130. The cryptographic information is used to decode or decrypt the secure vehicle control data, which is used to unlock the unmanned vehicle 140 for control by the operator via the control station 110. In various embodiments, the cryptographic information includes a decryption key and the decryption key is used to decrypt the encrypted vehicle control data.

In some embodiments, vehicle control data is transmitted along with the secure code to authenticate the operator. In other embodiments, the operator can be authenticated first and then control data can be sent to the unmanned vehicle 140 subsequently.

In some embodiments, the unmanned vehicle 140 is an unmanned aerial vehicle (UAV), an unmanned ground vehicle (UGV), an unmanned surface vehicle (USV), an unmanned underwater vehicle (UUV), and the like. In various embodiments, the unmanned vehicle 140 may be any autonomous or unmanned vehicle. For example, the UAV may be a quadcopter or other drone. The unmanned vehicle 140 communicably couples to the second access control device 150 using at least one of wired and wireless communications interfaces.

Once an operator is authenticated to operate the unmanned vehicle 140, the authentication may have a timeout period after which the operator may need to re-authenticate themselves to continue operation of the unmanned vehicle 140. For example, if unmanned vehicle 140 is a drone with a typical flying time of 30-60 minutes, then the operator's authentication credentials may automatically expire after 60 minutes. If unmanned vehicle 140 is an underwater vehicle such as a submarine, then the typical use time for the unmanned vehicle 140 may be multiple hours, days, or weeks. In that case, the operator's authentication may expire after a much longer duration. The expiration time may be set by a manufacturer of the unmanned vehicle 140 or by the operator of the unmanned vehicle 140.

Further, multiple people may be accepted by the unmanned vehicle 140 as authenticated operators for operating the vehicle. Some operators may also have varying privileges, such as "administrator" and "users" roles. The number of acceptable operators and the defined roles may be set by a manufacturer of the unmanned vehicle or by an operator of the vehicle.

In some embodiments, an operator needs to authenticate themselves on both a first access control device 120 and a second access control device 150. In other embodiments, an operator only needs to authenticate themselves on one of the access control devices.

Figure 2:
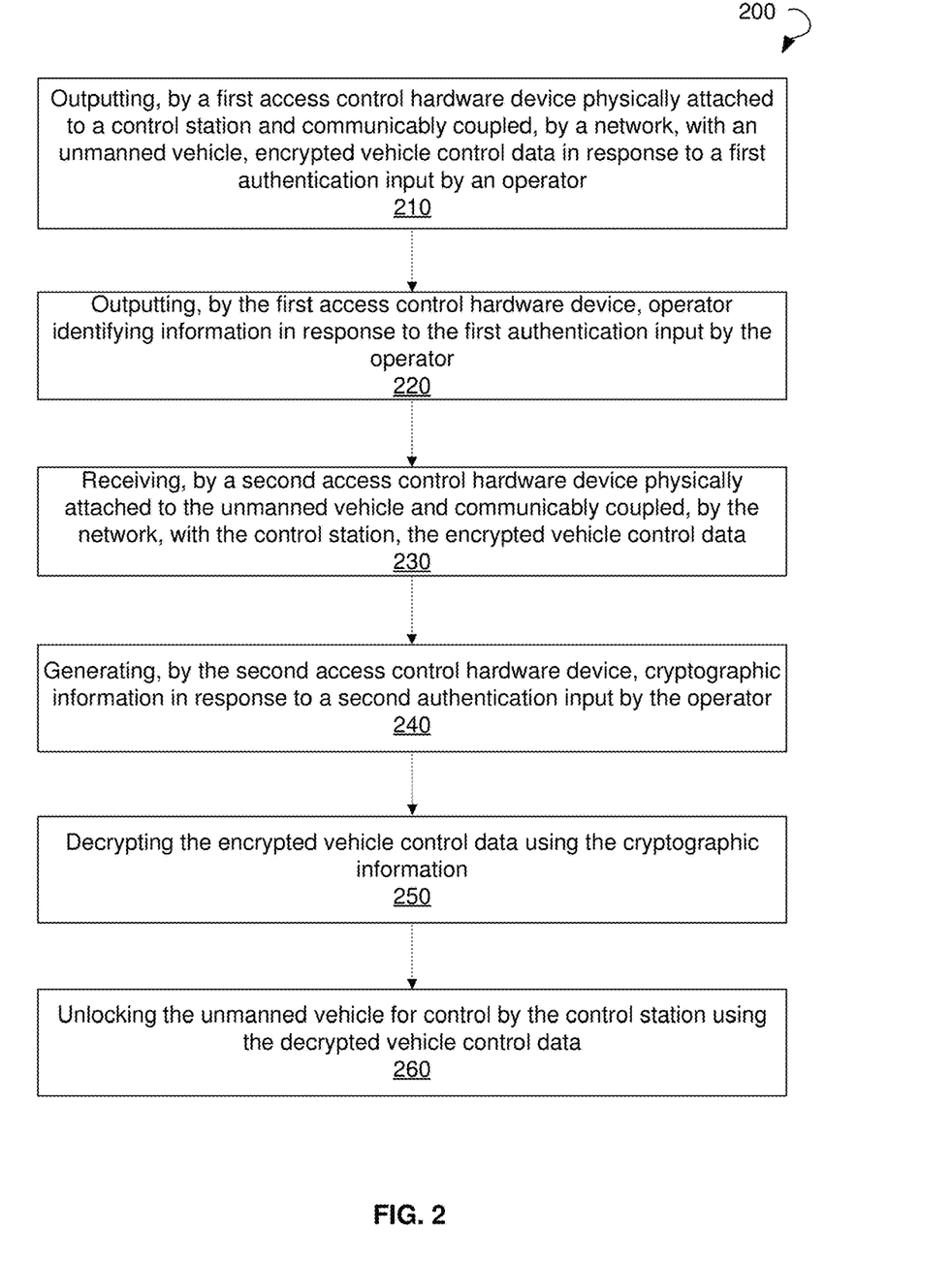
FIG. 2 is a simplified flow diagram for unmanned vehicle security, according to embodiments of the present technology.

FIG. 2 shows a method 200 for unmanned vehicle security, according to embodiments of the present technology. While the method has been described in these discrete steps, various steps may occur in a different order, or concurrently. Additionally, in various embodiments, some steps of the method may be omitted. The method 200 may be executed by the system 100, and includes outputting 210, by a first access control hardware device physically attached to a control station and communicably coupled, by a network (e.g., network 130), with an unmanned vehicle, encrypted vehicle control data in response to a first authentication input by an operator. Next the method 200 includes outputting 220, by the first access control hardware device, operator identifying information in response to the first authentication input by the operator. The method 200 includes receiving 230, by a second access control hardware device physically attached to the unmanned vehicle and communicably coupled, by the network, with the control station, the encrypted vehicle control data. The method 200 includes generating 240, by the second access control hardware device, cryptographic information in response to a second authentication input by the operator. Further, the method 200 includes decrypting 250 the encrypted vehicle control data using the cryptographic information and unlocking 260 the unmanned vehicle for control by the operator via the control station using the decrypted vehicle control data.

Figure 3:
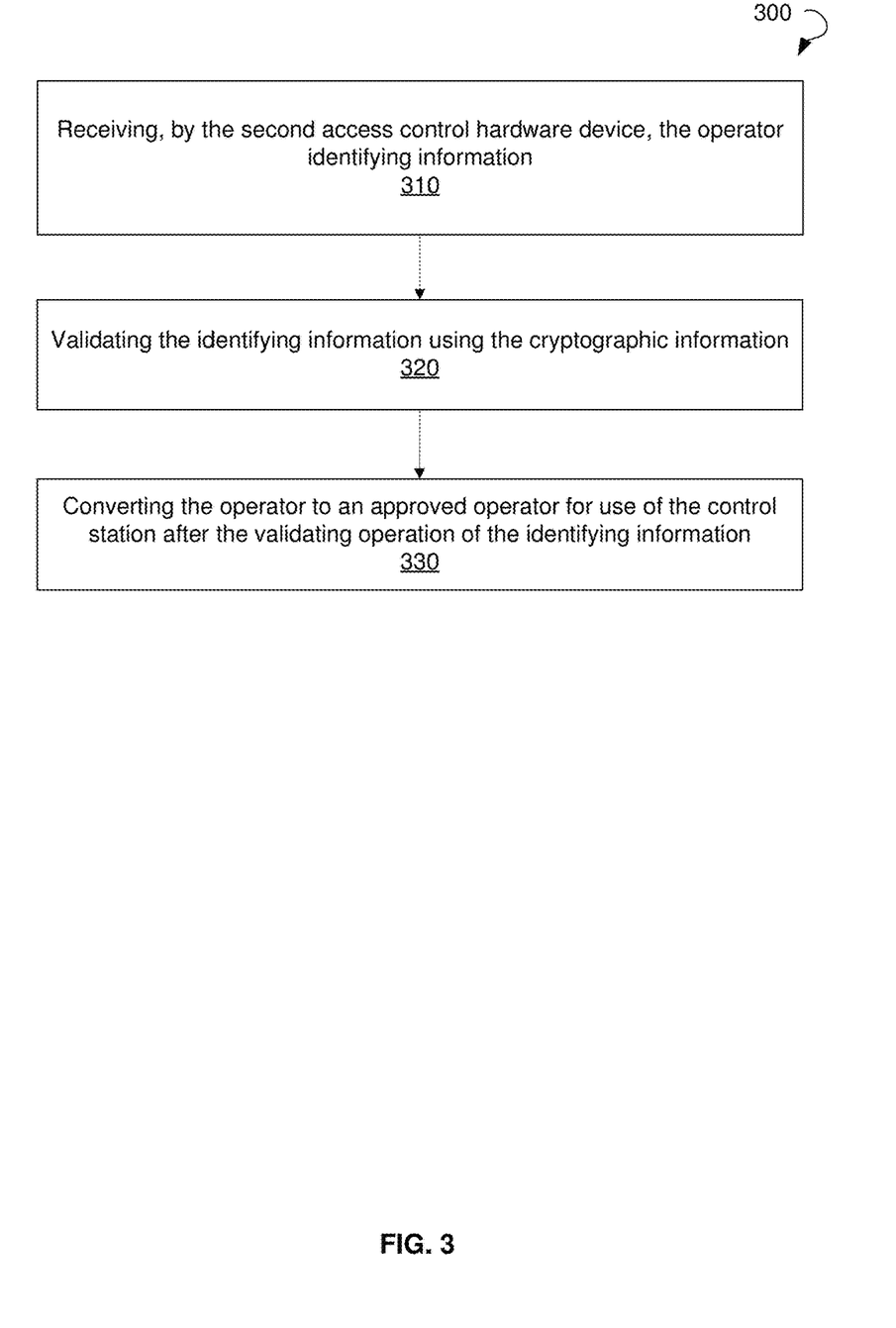
FIG. 3 is another simplified flow diagram for unmanned vehicle security, according to embodiments of the present technology.

FIG. 3 shows a method 300 for unmanned vehicle security, according to embodiments of the present technology. While the method has been described in these discrete steps, various steps may occur in a different order, or concurrently. Additionally, in various embodiments, some steps of the method may be omitted. The method may be executed by the system 100, and includes receiving 310, by the second access control hardware device, the operator identifying information. Next, the method 300 includes validating 320 the identifying information using the cryptographic information and converting 330 the operator to an approved operator for use of the control station after the validating operation of the identifying information.

Figure 4:
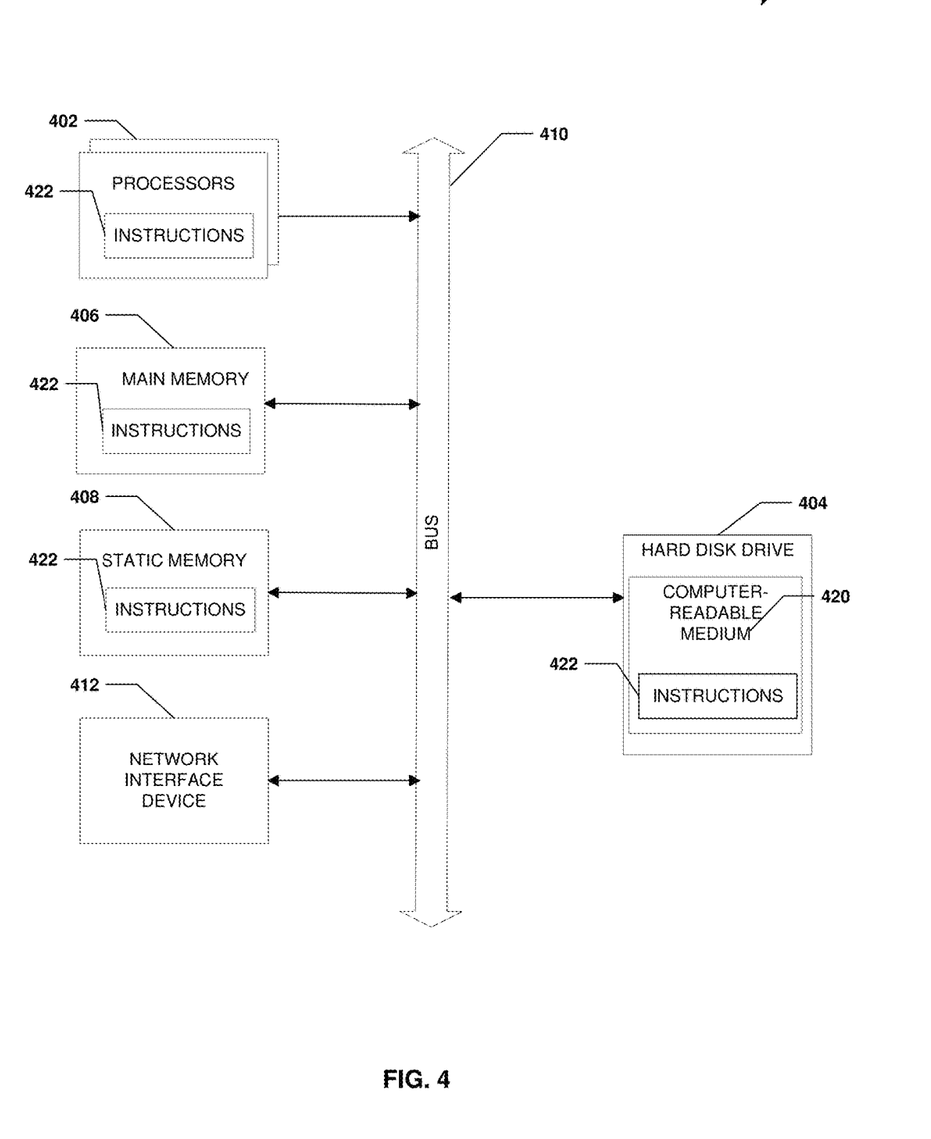
FIG. 4 is a simplified block diagram for a computing system, according to some embodiments.

Various embodiments of the present technology can be practiced with a local computer system, and/or a cloud-based system. FIG. 4 shows a diagrammatic representation of a computing device for a machine in the exemplary electronic form of a computer system 400, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a server, a personal computer (PC), a tablet PC, a set-top box, a cellular telephone, a digital camera, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 402, a hard disk drive 404, a main memory 406 and a static memory 408, which communicate with each other via a bus 410. The computer system 400 may also include a network interface device 412. The hard disk drive 404 may include a computer-readable medium 420, which stores one or more sets of instructions 422 embodying or utilized by any one or more of the methodologies or functions described herein. The instructions 422 can also reside, completely or at least partially, within the main memory 406 and/or the static memory 408 and/or within the processors 402 during execution thereof by the computer system 400. The main memory 406, the static memory 408, and the processors 402 also constitute machine-readable media.

While the computer-readable medium 420 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, RAM, ROM, and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, python™, JavaScript, Go, or other compilers, assemblers, interpreters or other computer languages or platforms.

The processing for various embodiments may be implemented in software that is cloud-based. In some embodiments, the computer system 400 is implemented as a cloud-based computing environment, such as a virtual machine operating within a computing cloud. In other embodiments, the computer system 400 may itself include a cloud-based computing environment, where the functionalities of the computer system 400 are executed in a distributed fashion. Thus, the computer system 400, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 400, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the systems and methods provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

Computer program code for carrying out operations for aspects of the present technology may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be coupled with the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products, according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, systems and methods for secure unmanned vehicle operation and communication are described herein. While various embodiments have been described, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the present technology should, therefore, be determined not with reference to the above description, but instead should be determined with reference to the appended claims along with their full scope of equivalents.

What is claimed is:

1. A hardware based system for secure wireless communications between an unmanned vehicle and an authorized operator of the unmanned vehicle, the system comprising:
   a remote control station configured to communicate with the unmanned vehicle;
   the unmanned vehicle, configured to be initially locked from remote control by the remote control station;
   a first access control hardware device physically attached to the control station and communicably coupled, using a network, with the unmanned vehicle, the first access control hardware device configured to:
      receive a first authentication input from an operator;
      in response to validating the first authentication input from the operator, generate encrypted vehicle control data; and
      output, using a first processor and a first memory, the encrypted vehicle control data and operator identifying information to the unmanned vehicle; and
   a second access control hardware device physically attached to the unmanned vehicle and communicably coupled, using the network, with the remote control station, the second access control hardware device configured to:
      receive a second authentication input from the operator;
      receive the encrypted vehicle control data and the operator identifying information from the first access control hardware device physically attached to the control station;
      generate, using a second processor and a second memory, cryptographic information in response to validating the second authentication input by the operator;
      decrypt the encrypted vehicle control data generated from validating the first authentication input by the operator, using the generated cryptographic information; and
      based on validating the decrypted vehicle control data:
         designate the operator as an approved operator for use of the remote control station; and
         unlock the unmanned vehicle for control by the approved operator via the remote control station using a secure wireless connection between the remote control station and the unmanned vehicle, wherein the approved operator designation expires after a limited duration of time.

2. The system of claim 1, wherein the unmanned vehicle is at least one of an unmanned aerial vehicle (UAV), an unmanned ground vehicle (UGV), an unmanned surface vehicle (USV), and an unmanned underwatervehicle (UUV).

3. The system of claim 1, wherein at least one of the first authentication input by the operator and the second authentication input by the operator is biometric authentication.

4. The system of claim 3, wherein the biometric authentication uses biometric identifiers of the operator including at least one of a fingerprint, face recognition, voice authentication, a palm print, hand geometry, iris recognition, retina recognition, and a deoxyribonucleic acid (DNA) sample.

5. The system of claim 1, wherein at least one of the first authentication input by the operator and the second authentication input by the operator is a token-based identification system.

6. The system of claim 5, wherein the token-based identification system uses a personal identification document of the operator including at least one of an unmanned vehicle license, a government issued identification, and a smart card.

7. The system of claim 1, wherein at least one of the first authentication input by the operator and the second authentication input by the operator is a knowledge-based identification system.

8. The system of claim 7, wherein the knowledge-based identification system uses at least one of a password and a personal identification number.

9. The system of claim 1, wherein the cryptographic information includes a decryption key, the decryption key being used to decrypt the encrypted vehicle control data.

10. A hardware-based method for secure wireless communications between an unmanned vehicle and an authorized operator of the unmanned vehicle, the method comprising:
   outputting, by a first access control hardware device physically attached to a control station and communicably coupled, by a network, with an unmanned vehicle, using a processor and memory, encrypted vehicle control data for a secure wireless connection between the control station and the unmanned vehicle, wherein the outputting occurs in response to a first authentication input by an operator;
   outputting, by the first access control hardware device, operator identifying information in response to the first authentication input by the operator;
   receiving, by a second access control hardware device physically attached to the unmanned vehicle and communicably coupled, by the network, with the control station, the encrypted vehicle control data from the first access control hardware device;
   generating, by the second access control hardware device, cryptographic information to decrypt the encrypted vehicle control data, in response to a second authentication input by the operator;
   decrypting, by the second access control hardware device, the encrypted vehicle control data using the cryptographic information;
   designating the operator as an approved operator to control the unmanned vehicle via the control station;
   unlocking, by the second access control hardware device, the unmanned vehicle for control by the approved operator via the control station using the decrypted vehicle control data and using the secure wireless connection between the control station and the unmanned vehicle, wherein the approved operator designation expires after a limited duration of time;

receiving, by the second access control hardware device, the operator identifying information from the first access control hardware device;

validating the operator identifying information using the cryptographic information; and converting the operator to an approved operator for use of the control station after validating the operator identifying information, based on both the first authentication input by the operator and the second authentication input by the operator.

11. The method of claim 10, wherein the unmanned vehicle is at least one of an unmanned aerial vehicle (UAV), an unmanned ground vehicle (UGV), an unmanned surface vehicle (USV), and an unmanned underwatervehicle (UUV).

12. The method of claim 10, wherein at least one of the first authentication input by the operator and the second authentication input by the operator is biometric authentication.

13. The method of claim 12, wherein the biometric authentication uses biometric identifiers of the operator including at least one of a fingerprint, face recognition, voice authentication, a palm print, hand geometry, iris recognition, retina recognition, and a deoxyribonucleic acid (DNA) sample.

14. The method of claim 10, wherein at least one of the first authentication input by the operator and the second authentication input by the operator is a token-based identification system, the token-based identification system using a personal identification document of the operator including at least one of a unmanned vehicle license, a government issued identification, and a smart card.

15. The method of claim 10, wherein at least one of the first authentication input by the operator and the second authentication input by the operator is a knowledge-based identification system, the knowledge-based identification system using at least one of a password and a personal identification number.

16. The method of claim 10, wherein the cryptographic information includes a decryption key, the decryption key being used to decrypt the encrypted vehicle control data.

17. A hardware-based system for unmanned vehicle security, the system comprising:

a control station configured to communicate with an unmanned vehicle;

the unmanned vehicle configured to be initially locked from remote control by the control station;

a first access control hardware device physically attached to the control station and communicably coupled, using a network, with the unmanned vehicle, the first access control hardware device configured to:

receive a first biometric authentication input from an operator; and in response to receiving the first biometric authentication input from the operator, generate and output encrypted vehicle control data, operator identifying information, and a decryption key for a secure wireless connection between the control station and the unmanned vehicle; and a second access control hardware device physically attached to the unmanned vehicle and communicably coupled, using the network, with the control station, the second access control hardware device configured to:

receive a second biometric authentication input from the operator;

receive the operator identifying information from the first access control hardware device; and generate cryptographic information in response to the second biometric authentication input by the operator, the cryptographic information being used with the decryption key to decrypt the encrypted vehicle control data for the secure wireless connection between the control station and the unmanned vehicle and validate the operator identifying information, the decrypted vehicle control data used to designate the operator as an approved operator for use of the control station and unlock the unmanned vehicle for control by the approved operator via the control station using the secure wireless connection between the control station and the unmanned vehicle, wherein the approved operator designation expires after a limited duration of time.

18. The system of claim 17, wherein the unmanned vehicle is at least one of an unmanned aerial vehicle (UAV), an unmanned ground vehicle (UGV), an unmanned surface vehicle (USV), and an unmanned underwatervehicle (UUV).

19. The system of claim 17, wherein the biometric authentication uses biometric identifiers of the operator including at least one of a fingerprint, face recognition, voice authentication, a palm print, hand geometry, iris recognition, retina recognition, and a deoxyribonucleic acid (DNA) sample.

* * * * *